Nov. 15, 1927.
A. SENCHAK
INDICATOR
Filed March 28, 1927
1,649,197
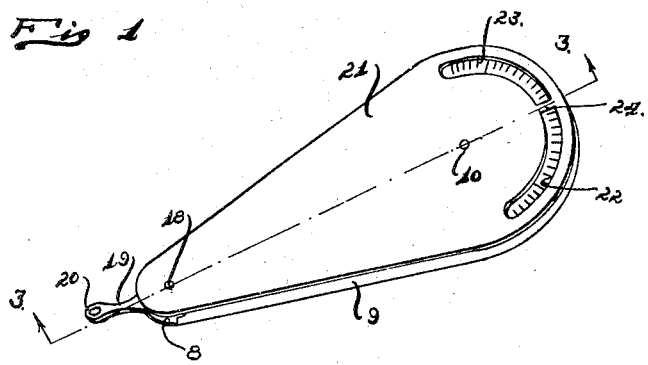
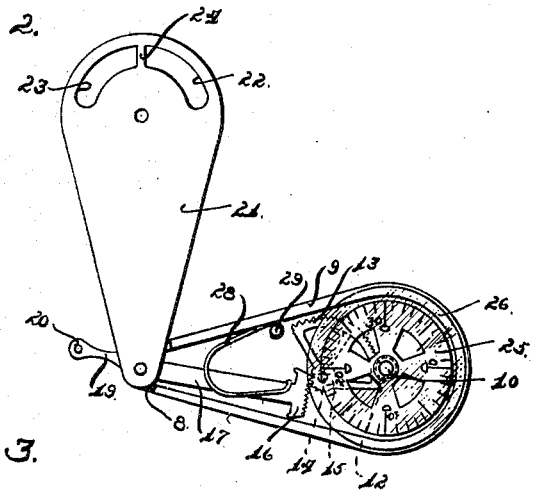
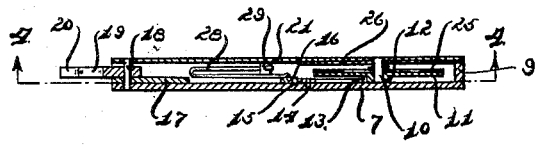
INVENTOR.
Andrew Senchak
BY
Thos. L. Donnell
ATTORNEY.

Patented Nov. 15, 1927.

1,649,197

UNITED STATES PATENT OFFICE.

ANDREW SENCHAK, OF DETROIT, MICHIGAN.

INDICATOR.

Application filed March 28, 1927. Serial No. 178,828.

My invention relates to a new and useful improvement in an indicator adapted for testing the accuracy of various kinds of lathe and machine work, and for indicating variations from a predetermined contour or dimension of the surface of the article under test.

It is an object of the present invention to provide an indicator of this class which will be simple in structure, economical of manufacture and highly efficient in use.

Another object of the invention is the provision of a device of this kind which will be most efficient in use and which will be provided with a multiplying mechanism so that a very small variation may be clearly indicated by the machine.

Other objects will appear hereinafter.

The invention consists in the combination and arrangement of parts hereinafter described and claimed.

The invention will be best understood by a reference to the accompanying drawings which form a part of this specification and in which, Fig. 1 is a perspective view of the invention.

Fig. 2 is a top plan view of the invention with the cover plate swung aside.

Fig. 3 is a sectional view taken on substantially line 3—3 of Fig. 1

Fig. 4 is a view taken on substantially line 4—4 of Fig. 3.

I have enclosed the mechanism in a housing 7 having a slot 8 formed in the side wall 9 at the converging end, the housing being triangularly shaped. Mounted rotatably on a shaft 10 which is projected upwardly from the base of the housing is a dial wheel 11 carrying on one face the graduations, as shown in Fig. 2. Fixed to the dial wheel 11 at its undersurface and journalled on the shaft 10, is a pinion 12 adapted to mesh with the teeth of the segment 13, this segment 13 projecting outwardly from a hub 15 which is mounted on a shaft 14 secured in the base of the housing. The hub is provided with teeth meshing with teeth formed on a cross head 16 mounted on the arm 17 pivotally mounted on the shaft 18, which is fixed in the base of the housing. The end 19 of the arm 17 projects exteriorly of the housing through the slot 8 and carries at its outer end a feeler 20. A cover 21 is mounted on the housing and provided with arcuate slots 22 and 23 which are adapted, when the cover is in position on the housing, to expose the graduations on the dial wheel 11, so that as the wheel 11 is rotated the variations may be noted, a central rib 24 separating the slots 22 and 23 and serving as a pointer or indicating member for the reading of the graduations on the dial wheel.

In the drawing I have illustrated the graduations as carried on a separate disc 25 which is mounted on the dial wheel 11, but if desired, these graduations may be formed directly on the dial wheel 11. A transparent closure 26 is mounted beneath the cover 21 so as to protect the device from foreign material, such as dust and the like.

A spring 28 is curled about, at one end, the stud 29, and doubled upon itself, the opposite end 30 being bent around the arm 17 so as to normally retain the arm swung to one side of the housing. In this manner the spring resists rocking movement of the arm 17 and tends to normally restore it to its original position after rocking movement.

In operation the feeler 20 is in engagement with the workpiece to be measured. As variations are encountered in this workpiece which is generally being rotated, the arm 17 will be swung on the shaft 18 as a pivot, thus effecting a rotation of the dial wheel 11, this rotation being effected through the multiplying mechanism clearly illustrated in Fig. 4.

The device is one which is compact, easily and quickly assembled, and which has proven most efficient in operation for the purposes intended.

While I have illustrated and described the preferred form of my invention, I do not wish to limit myself to the precise details of structure shown, but desire to avail myself of such variations and modifications as come within the scope of the appended claims.

Having thus described my invention what I claim as new and desire to secure by Letters Patent is:

1. An indicator of the class described, comprising: a substantially triangular shaped housing having a base and side walls, the side walls at the apex being cut away to provide a slot; a cover for said housing, said cover having arcuate openings formed therein; a rotatably mounted wheel in said housing at the larger end thereof, said wheel carrying graduations on one face, said graduations being visible through said arcuate openings; a pinion fixedly mounted on said wheel; a segment rockingly mounted in said housing, and meshing with said pinion; a hub on said segment; teeth formed on said hub; an arm rockably mounted on said housing and having one end projecting therefrom; a cross head on the other end of said arm; teeth formed on said cross head meshing with the teeth on said hub and adapted, upon rocking of said arm, for effecting, through said segment, a rotation of said dial wheel.

2. An indicator of the class described, comprising: a housing having a slot formed in its wall; an arm pivotally mounted in said housing and projected at one end through said slot; a cross head on the other end of said arm; teeth formed on said cross head; a dial carrying wheel rotatably mounted in said housing; a pinion fixedly mounted on said wheel; a segment meshing with said pinion; a hub on said segment; teeth on said hub; the teeth on said cross head meshing with the teeth on said hub, the rocking of said arm effecting a rotation of said dial carrying wheel; and a spring for normally resisting rocking movement of said arm and restoring said arm to normal position after rocking movement.

3. An indicator of the class described, comprising: a substantially triangular shaped housing having a base and side walls, the side walls at the apex being cut away to provide a slot; a cover for said housing, said cover having arcuate openings formed therein; a rotatably mounted wheel in said housing at the larger end thereof, said wheel carrying graduations on one face, said graduations being visible through said arcuate openings; a pinion fixedly mounted on said wheel; a segment rockingly mounted in said housing and meshing with said pinion; a hub on said segment; teeth formed on said hub; an arm rockably mounted on said housing and having one end projecting therefrom; a cross head on the other end of said arm; teeth formed on said cross head meshing with the teeth on said hub and adapted, upon rocking of said arm, for effecting, through said segment, a rotation of said dial wheel; and resilient means in said housing for resisting rocking of said arm and tending to restore the same to normal position after rocking movement.

In testimony whereof I have signed the foregoing specification.

ANDREW SENCHAK.